US005335900A

United States Patent [19]

Bonde

[11] Patent Number: 5,335,900

[45] Date of Patent: Aug. 9, 1994

[54] MODEL AIRPLANE BUILDERS JIG

[76] Inventor: Randall W. Bonde, 1335 Highway 69, Box 332, Belmond, Iowa 50421

[21] Appl. No.: 95,587

[22] Filed: Jul. 23, 1993

[51] Int. Cl.5 .............................................. B23Q 1/04

[52] U.S. Cl. ........................................ 269/51; 269/71; 269/78; 269/82; 269/95

[58] Field of Search ........................ 269/77, 78, 60, 71, 269/82, 45, 47, 50, 51, 95

[56] References Cited

U.S. PATENT DOCUMENTS

| | | | |
|---|---|---|---|
| 4,253,649 | 3/1981 | Hewson | 269/82 |
| 4,392,645 | 7/1983 | Westphal | 269/77 |
| 4,541,621 | 9/1985 | Amos | 269/71 |
| 4,577,844 | 3/1986 | Schlegel et al. | 269/78 |
| 4,974,576 | 12/1990 | Morey et al. | 269/60 |
| 5,224,691 | 7/1993 | Clark | 269/71 |

FOREIGN PATENT DOCUMENTS

| | | | |
|---|---|---|---|
| 825899 | 12/1937 | France | 269/78 |
| 13249 | 12/1896 | Switzerland | 269/78 |

*Primary Examiner*—Robert C. Watson

[57] ABSTRACT

A supporting holder for a model airplane or similar small device being worked on, The holder is adjustable in various directions so that the work piece can be turned over, turned at right angles to an original position and variously placed for easy manipulation. In at least one position, the holder is adjustable to set the model such as an airplane in a precise location so that the angle of incidence of the wing and of the tail surfaces can be accurately set.

4 Claims, 2 Drawing Sheets

MODEL AIRPLANE BUILDERS JIG

BACKGROUND AND SUMMARY OF THE INVENTION

This invention pertains to auxiliary devices for holding work pieces being worked on. Specifically, it concerns itself with a holder adapted to hold a model airplane while the airplane is being covered with fabric or other covering and is also useful for setting and adjusting angles of incidence of the wings and control surfaces.

Model airplanes built to fly under control of radio-activated devices are usually of a size inconvenient for holding in one hand while being worked on with another. They also are not rugged enough to be held in a vice or similar gripping device.

This situation becomes a problem during either the covering or recovering process particularly on the fuselage. The covering material should be stretched relatively smoothly over a slightly curved surface during the process, and when there is no other way of holding the fuselage, such stretching becomes nearly impossible. Therefore it is now almost necessarily a two-person task.

Another task facilitated by this invention is the setting of angles of incidence—particularly of the wing. The angle between the chord line of the wing and the line of thrust of the propeller is sensitive to the best flying qualities of the airplane. To a lesser extent, the same problem exists with regard to the fixed surfaces in the tail section. Therefore, it is desirable to have some sort of holder which can hold the fuselage in a fixed and known position (usually horizontal) while the wings and empennage are being assembled onto the fuselage.

By the present invention a device is provided which will fasten to the fuselage at a convenient place and which will allow almost universal movement of the fuselage subject to being clamped and held in any position, and which has a sensitive adjustment to provide for adjustment to a specific position of the fuselage for assembly purposes. The specific means for accomplishing the purpose will be apparent from a study of the following specification and reference to the figures in which:

DESCRIPTION

Figure 1:
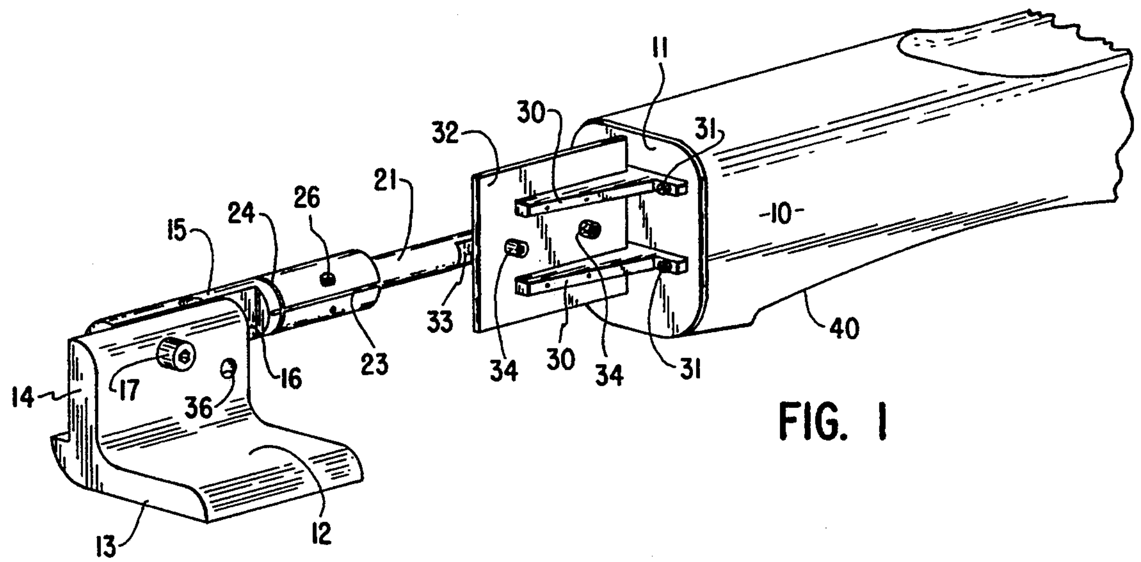
FIG. 1 is a perspective view of a fuselage of a model airplane being held by the holder.

Briefly, this invention comprises a holder for a model airplane fuselage adapted to be fastened to a bench or the like and to hold the fuselage in a multitude of positions for a plurality of purposes. More specifically and referring to the drawings, the holder is shown in FIG. 1 as holding a fuselage 10 of a model airplane. The fuselage includes a motor mounting bulkhead 11 at its front end to which the holder can be fixed.

The holder comprises a bracket 12 which may be clamped to a workbench—not shown. It will be obvious that holes could be formed in this bracket so that it could be fastened to a bench by screws or bolts or the like. This bracket has a bench engaging surface 13 and a vertical surface 14 in a virtual right angle relationship.

An arm 15 having a flat surface 16 is adjacent to and moveable across the vertical surface 14. This arm is pivotally connected to the bracket 12 by means of a screw 17. Thus, the arm 15 can be pivotally moved about the axis of the screw 17 and over the surface 16. The arm 15 is hollowed from one end to provide a socket 20 into which a shaft 21 on the attachment part shown in FIGS. 6 and 7 may be fitted. In order to provide clamping on the shaft 21, the portion of the arm 15 with the socket 20 is formed with a longitudinal slot 23 extending completely through the wall of the socket. A transverse cut 24 about half way across the tubular shape at the end of the arm 15 is also provided to allow some clamping action at that end. A screw 26 threaded into the walls of the tubular part may be used to cause the clamping action.

Figure 7:
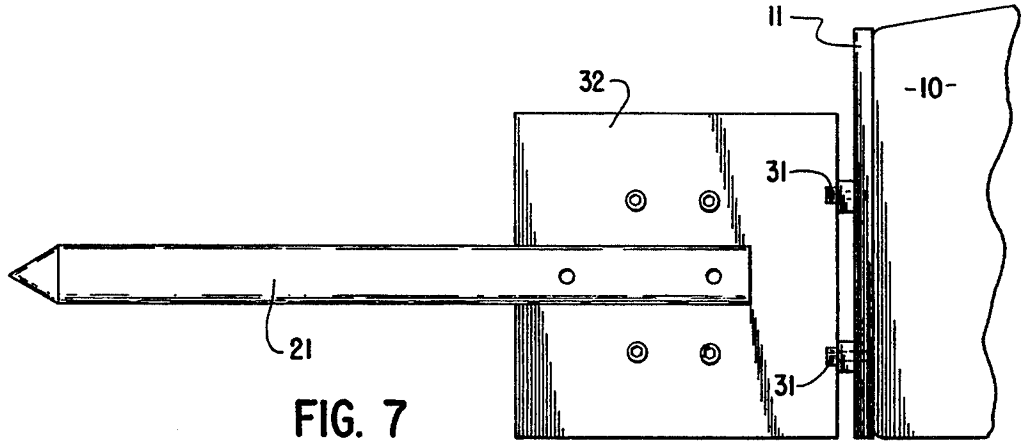
FIG. 7 is a side elevational view of the parts shown in FIG. 6.
Figure 6:
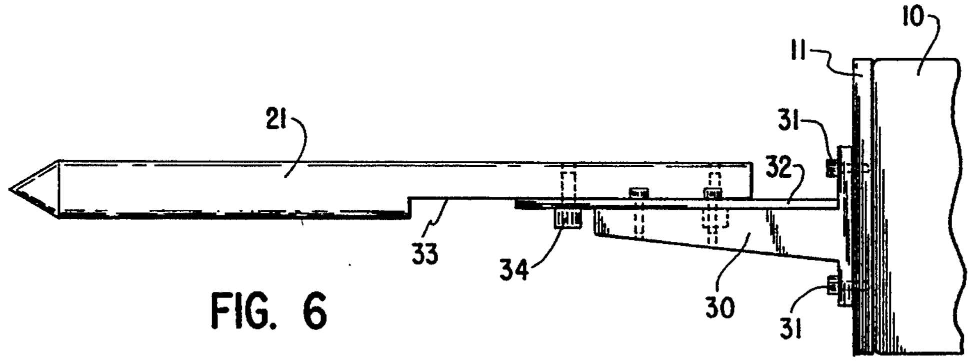
FIG. 6 is a top plan view of the attachment parts to an enlarged scale.
Figure 2:
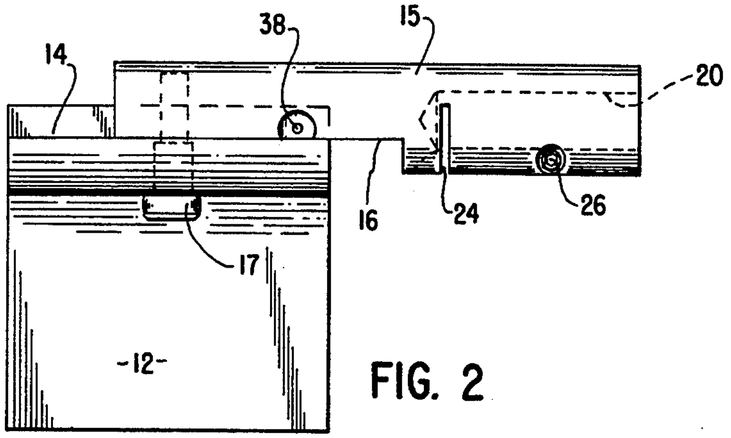
FIG. 2 is a top plan view of the operating parts of the holder.
Figure 3:
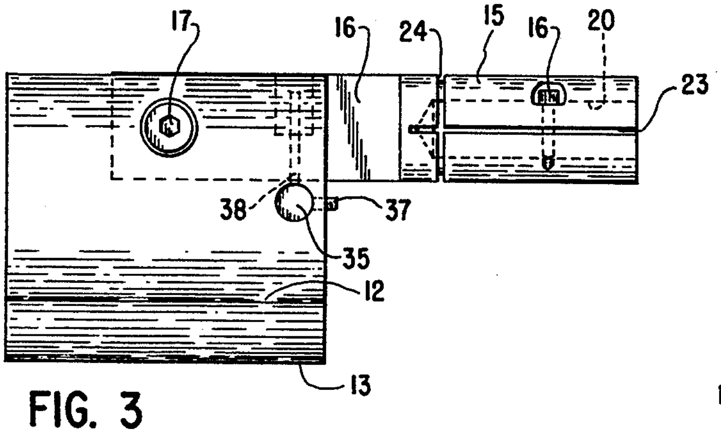
FIG. 3 is a side elevational view of the parts shown in FIG. 2.

The attachment part is best shown in FIGS. 6 and 7. This part is adapted to hold the fuselage 10 to the bracket part and includes the shaft 21 which fits into and can be clamped in the socket 20. The shaft is adapted to be held to the fuselage by a convenient means, but my preferred way is by a jig device fixed to the motor mount bulkhead 11 on the fuselage. This jig includes a pair of beams 30 fixed to the bulkhead 11 by screws 31. A plate 32 is fixed to the beams 30 and in turn is fastened to the shaft 21 at a flat surface 33 on that shaft. Screws 34 may be used for that purpose.

In use, the attachment part is fixed to the fuselage as noted. The shaft 21 is placed into the socket 20 and is turned to the position desired and then clamped. Dependent on the operation to be performed, the fuselage can then be raised or lowered by pivoting the arm 15 about the screw 17 and then clamping that arm in the desired position by tightening the screw 17. For covering the fuselage, painting or similar functions, that is the extent of necessary positioning. It will be noted that during the process, the position can be altered simply by releasing the appropriate screw and turning the fuselage to a new location.

Figure 4:
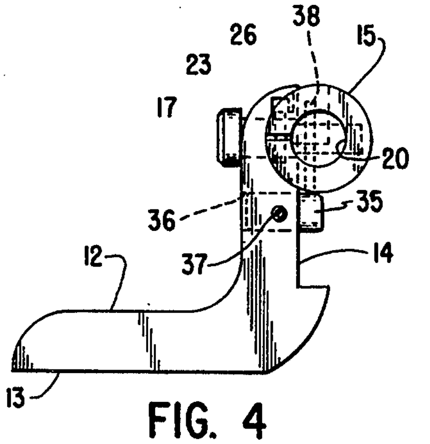
FIG. 4 is an end elevational view of the parts shown in FIG. 2.
Figure 5:
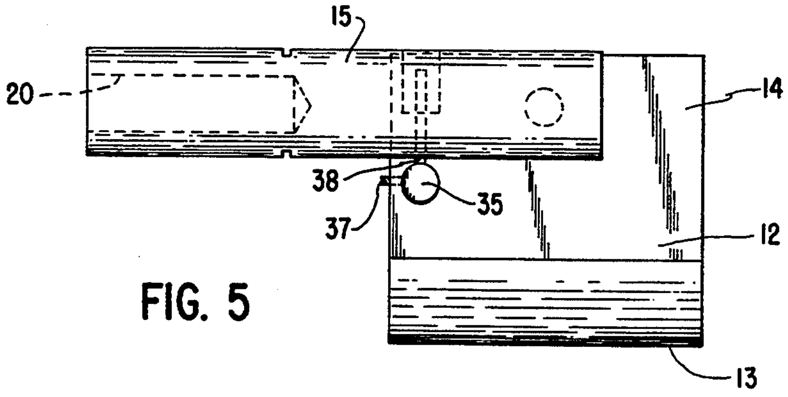
FIG. 5 is a view similar to FIG. 3 from the side opposite that shown in FIG. 3.

For certain functions, especially setting angles of incidence and the like, a more precise setting may be required. Ordinarily this would require a horizontal location for the center line of the fuselage. In order to make a fine adjustment of the position of the arm 15, adjustment means are built into the bracket 12. That means includes a peg 35 (FIG. 4) slidably disposed in a hole 36 in the bracket. When it is desired to position the arm accurately, this peg 35 is extended beyond the surface 14 as shown in FIG. 4 and is held there by a set screw 37. In that position, an adjusting screw 38 will abut the peg 35. By turning the screw in its threaded socket in the arm 15, the extension of the screw 38 can be increased or decreased and because of the contact with the peg 35, the angular position of the arm 15 will correspondingly change. When the desired position of the arm is reached, the wing may be placed in its socket 40 in the fuselage 10 and adjusted to the desired angle. It should be noted that when the peg 35 is withdrawn into the hole 36, the arm can then be turned below horizontal positions as well as raised above that.

By use of the device only one person is now needed for this function, and further, no added jigs are necessary. Similarly the fixed surface of the tail assembly may be adjusted. Thus, by this invention, the completion and assembly of the model is greatly simplified.

I claim as my invention:

1. For use in the completion and assembly of a model airplane having a motor mounting bulkhead on the fuselage of said airplane, a holding device for holding the airplane comprising a bracket adapted to be fixedly mounted, attachment means having means attachable to said bulkhead whereby said airplane can be rotated about the centerline of said fuselage, arm means pivotally attached to said bracket whereby the angle of said arm means relative to horizontal can be altered, screw means threadably engaged in said arm means, abutment means slidably engaged in said bracket, said abutment means being slidable to a location in which it will be abutted by an end of said screw means whereby said angle of said arm means can be adjusted by turning said screw means.

2. The holding device of claim 1 in which said arm means includes an end portion formed to provide a socket, and said attachment means includes a shaft rotatably disposed in said socket.

3. The holding device of claim 1 in which said arm means includes an end portion formed to provide a socket, and said attachment means includes a shaft rotatably disposed in said socket, said socket having walls of substantially tubular form, said walls having a slot to allow clamping of the walls around the shaft and means engaged between said walls on opposite sides of said slot to clamp said shaft in position, said means engaged between said walls including a screw engaging the walls on a first side of said slot and threaded into the wall on the side opposite said first side whereby tightening that will clamp said walls about said shaft.

4. The holding device of claim 1 in which said abutment means includes a peg slidably engaged in a hole in said bracket, and set screw means in said bracket will engage said peg to hold it from sliding in said holes.

* * * * *